T. R. SINCLAIRE.
PACKING FILTERS.
No. 171,439.
Patented Dec. 21, 1875.
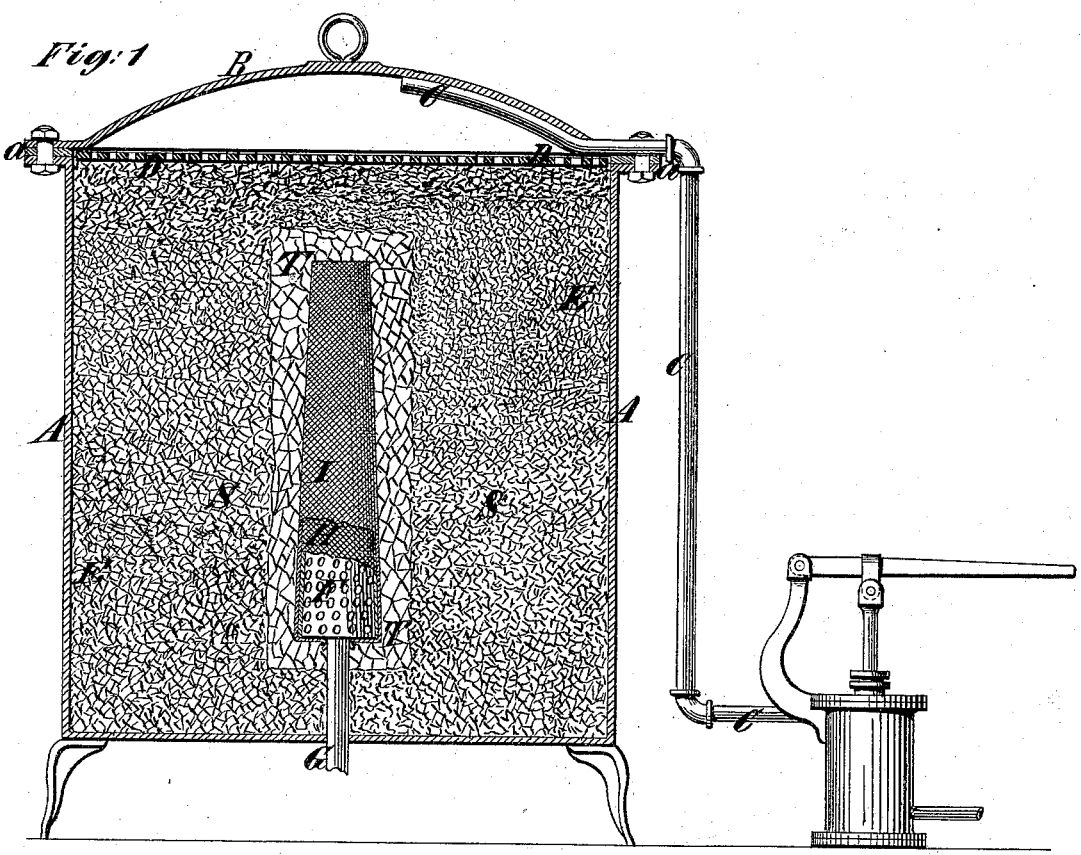
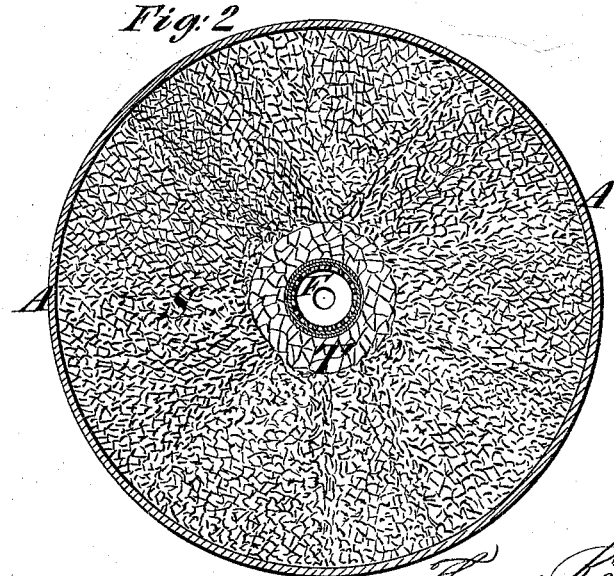

UNITED STATES PATENT OFFICE.

THOMAS R. SINCLAIRE, OF NEW YORK, N. Y.

IMPROVEMENT IN PACKING FILTERS.

Specification forming part of Letters Patent No. 171,439, dated December 21, 1875; application filed April 6, 1874.

*To all whom it may concern:*

Be it known that I, THOMAS R. SINCLAIRE, of the city, county, and State of New York, have invented certain Improvements in Method or Process of Packing Filtering-Chambers, of which the following is a specification:

This invention relates to a method or process of arranging a coarser, or more permeable or less resisting, material within a filtering-vessel, in such relation to its vertical walls and to the walls of an inwardly-projecting device which receives or distributes the liquid, and to the body of the filtering material proper, that the apparatus may be caused to filter, clarify, or rectify a greater quantity of liquid without increasing the pressure of the liquid, and without changing the mechanical construction of the apparatus, as will be hereinafter more fully explained.

My said invention is illustrated in the accompanying drawing, in which Figure 1 represents a vertical section of a filter, and Fig. 2 a horizontal section of the same.

A designates a vessel, which may be of cylindrical, conical, or any suitable form and size. The said vessel is shown as provided with a cover, B, which may be suitably secured in place and be packed at the joint, say as shown at *a*. C is a pipe through which to supply liquid, while under pressure, to the said vessel A. That part of the vessel designed for containing the charcoal or other filtering material is termed the filtering-chamber, and is designated by the letter E. Within, or partially within, the chamber E there is arranged a perforated or permeable device, which I term a "receiver" or "distributer," because it serves as a receiver of the filtered liquid when the machine is fed through the pipe C at some upper part thereof, say above the plate D, as shown in the drawing, and because it also serves as a distributer of the liquid to be filtered when the pipe C is attached to the pipe G.

In the drawing I have shown a conical receiver or distributer, F, supported in an elevated position, and centrally within the chamber E, by an outlet-pipe, G. The said receiver or distributer F is preferably made of perforated metal, and may be provided with a wire-gauze cover, H, and a jacket, I, of any suitable permeable material, either or both, as found desirable, and such receiver or distributer may be conical, as shown in the drawing, or spherical or rectangular, or of any other suitable shape, and may be located wholly or partially within the filtering-chamber, as found desirable.

An apparatus of the general construction above referred to will be found illustrated and described in United States Letters Patent granted to me November 14, 1871, and reissued October 15, 1872, and again reissued November 3, 1874.

It is often desirable, in the practical operation of the said machine, to have any given machine filter, clarify, or rectify a greater quantity of liquid than it is capable of doing when packed with the filtering material in the ordinary manner, and heretofore this has not been successfully accomplished without changing the mechanical construction of the apparatus. Fine or pulverized charcoal S is usually employed as the filtering medium in these machines, and the chamber E has heretofore usually been filled or partially filled with this material, and when so packed a given quantity of liquid only can be caused to percolate through it. I have found that by a novel method of packing the chamber, or by a novel arrangement of the filtering material therein, I can cause the same machine to properly filter, clarify, or rectify a greater quantity of liquid under the same pressure in a given time than such machine could accomplish when packed in the ordinary way. I am enabled to effect the said result by employing, in connection with the filtering material proper, some coarser, or more permeable or less resisting, substance than the body of the filtering material proper, arranged or disposed between the vertical walls of the filtering-chamber and the walls of the receiver or distributer, in such manner as to produce a vertical stratum or column (one or more) lying within, or contiguous to, the filtering material proper, and between the said walls of the filtering-vessel and the walls of the receiver or distributer. In the drawing I have shown a column of coarse charcoal, T, adjacent to and surrounding the receiver or distributer F, and I thereby relieve the chamber of the resisting power which would be possessed by the closely-packed and denser filtering material proper were it to occupy the space thus occupied by the coarser and more permeable material T, and consequently a greater quantity of liquid may be passed through the chamber under a given pressure when so packed.

It is obvious that various substances may be employed for the less resisting material, so long as it is more easily permeated than the filtering material proper, and not of such a nature as to injure the liquid being treated.

What I claim, and desire to secure by Letters Patent, is—

1. The method or process herein described of packing the chamber of a filtering-vessel, by interposing a vertical stratum or column (one or more) of coarser, or more permeable or less resisting, substance than the body of the filtering material proper between the vertical wall or walls of the filtering-chamber and the wall or walls of a receiver or distributer, arranged or projecting wholly or partially within the said filtering-chamber, substantially as herein specified.

2. The combination, in a filtering chamber or vessel, of a vertical stratum or column (one or more) of coarser, or more permeable or less resisting, substance than the body of the filtering material proper, interposed between the vertical wall or walls of the filtering-chamber and the wall or walls of a receiver or distributer, arranged or projecting wholly or partially within the said filtering-chamber, with a stratum (one or more) of like or similar substance interposed between the top and bottom walls, either or both, of the said chamber or vessel and the wall or walls of the said receiver or distributer.

THOS. R. SINCLAIRE.

Witnesses:
HENRY T. BROWN,
MICHAEL RYAN.